United States Patent [19]
Glass

[11] 3,777,344
[45] Dec. 11, 1973

[54] METHOD OF FABRICATING FLUIDIC ELEMENTS BY ASSEMBLING TOGETHER A PLURALITY OF PLASTIC STRIPS

[76] Inventor: John P. Glass, c/o Cava Industries 79 La Grange Ave., Essington, Pa. 19029

[22] Filed: June 30, 1972

[21] Appl. No.: 267,965

Related U.S. Application Data

[62] Division of Ser. No. 828,643, May 28, 1969, Pat. No. 3,589,382, division of Ser. No. 88,582, Nov. 12, 1970

[52] U.S. Cl............... 29/157 R, 29/527.1, 137/833
[51] Int. Cl............................................. B23p 17/00
[58] Field of Search................... 137/833; 264/225, 264/227; 29/157 R, 527.1

[56] References Cited
UNITED STATES PATENTS

| | | | |
|---|---|---|---|
| 3,459,847 | 8/1969 | Steptoe et al................... | 137/833 X |
| 3,539,429 | 11/1970 | Kilduff et al..................... | 137/833 X |
| 3,461,900 | 8/1969 | Dexter et al........................ | 137/833 |
| 3,528,445 | 9/1970 | Shinn et al.......................... | 137/833 |
| 3,441,996 | 5/1969 | Boothe............................... | 29/157 R |
| 3,442,280 | 5/1969 | Boothe................................ | 137/833 |
| 3,495,604 | 2/1970 | Trask................................ | 137/833 X |
| 3,683,486 | 8/1972 | Rope et al....................... | 264/225 X |

*Primary Examiner*—Charles W. Lanham
*Assistant Examiner*—D. C. Reiley, III
*Attorney*—John F. A. Earley

[57] ABSTRACT

A fluidic plate assembly comprising a series of abutting plates including a power nozzle plate having an input chamber which narrows down into a power nozzle, a control passageway plate having an interaction chamber with an opening that registers with the power nozzle and having a plurality of control passageways with nozzles that open into the interaction chamber, a splitter plate having a splitter which extends into the interaction chamber to form an output ring and having a plurality of output passageways that register with the output ring, and means connecting adjacent plates together and forming a tight seal. Apparatus for making fluidic plates comprising standard mold units for making a series of plates in various combinations including power nozzle plates, splitter plates, and control passageway plates.

9 Claims, 13 Drawing Figures

3,777,344

METHOD OF FABRICATING FLUIDIC ELEMENTS BY ASSEMBLING TOGETHER A PLURALITY OF PLASTIC STRIPS

CROSS-REFERENCE TO RELATED APPLICATIONS

This application is a division of my patent application Ser. No. 828,643, filed May 28, 1969, now U. S. Pat. No. 3,589,382, issued June 29, 1971, and my divisional patent application Ser. No. 88,582, filed Nov. 12, 1970.

BACKGROUND OF THE INVENTION

This invention relates to fluidics, and more particularly concerns plates which are adapted to be organized into fluidic elements so as to conduct a liquid or gas fluid. Further, the invention relates to plates wherein the fluid may be conducted in a direction other than the direction conventionally provided in fluidic elements, the conventional direction being parallel to the plane of the surfaces of the fluidic plates.

Fluidics is a name given to a system comprising apparatus such as computers and controls operated by liquid or gas fluids which are piped throughout the system. Fluidics may serve as an alternative for electronics, and fluidic elements may be used to manipulate, regulate, or control the flow of a fluid in much the same manner that electrical elements such as resistors, capacitors, volume controls, and switches are used to handle the flow of electricity in electrical systems.

Fluidic elements are less expensive than comparative electronic elements, and are less sensitive to temperature, corrosion, wear, breakdown, shock, and radioactivity.

However, the design and manufacture of fluidic elements have presented a number of problems. For example, sealing between plates has always been a problem.

Another problem has been lack of flexibility. A fluidic element designed to do a specific job is cast and formed of a plastic or other material, and its components such as control nozzles, passageways, and power nozzles, may not be altered so as to adapt the fluidic element for a similar but somewhat different job.

SUMMARY OF THE INVENTION

Accordingly, it is an object of this invention to provide fluidic elements which overcome the problems of the prior art. It is another object to provide fluidic elements which convey a fluidic signal in a direction which is not parallel to the plane of the fluidic plates.

It is another object to provide a fluidic element which is tightly sealed.

It is another object to provide a plurality of standard mold units which may be assembled in different ways to build a number of different fluidic plates and elements.

BRIEF DESCRIPTION OF THE DRAWINGS

Other objects and advantages of this invention, including its simplicity and economy, as well as the ease with which it may be adapted to existing equipment will further become apparent hereinafter and in the drawings, in which.

DESCRIPTION OF THE PREFERRED EMBODIMENTS

Figure 1:
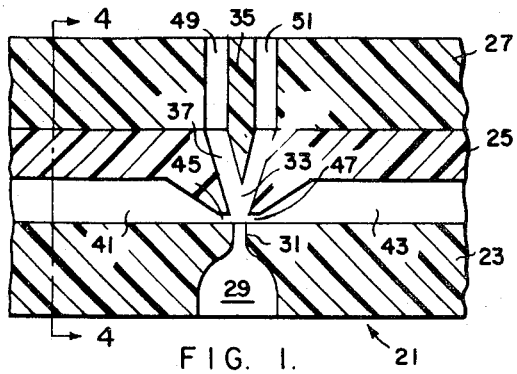
FIG. 1 is a view in vertical section of three plates connected together to form a fluidic element, an amplifier.
Figure 2:
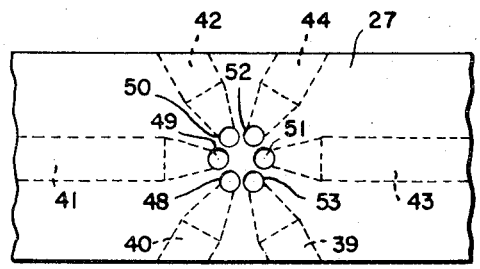
FIG. 2 is a view in top plan of the fluidic element of FIG. 1.
Figure 3:
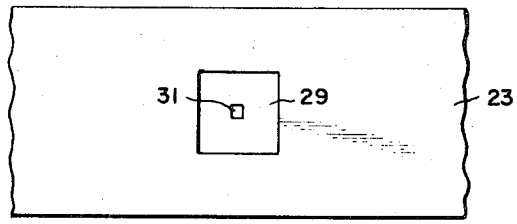
FIG. 3 is a view in bottom plan of the fluidic element of FIG. 1.
Figure 4:
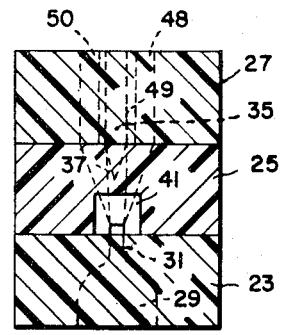
FIG. 4 is a view in section looking in the direction of the lines and arrows 4—4 which appear in FIG. 1.

Although specific terms are used in the following description for clarity, these terms are intended to refer only to the structure shown in the drawings and are not intended to define or limit the scope of the invention.

Turning now to the specific embodiments of the invention selected for illustration in the drawings, there is shown in FIGS. 1–4 a fluidic element 21 which includes three fluidic plates 23, 25, and 27 having upper and lower flat surfaces that are substantially parallel. Fluidic element 21 is an amplifier made from power nozzle plate 23, control passageway plate 25, and splitter plate 27.

Power nozzle plate 23 has a fluid chamber 29 formed therein which narrows down into a power nozzle 31 that is shown as being rectangular in cross section but which may be circular.

Control passageway plate 25 includes an interaction chamber 33 with a bottom opening that registers with power nozzle 31, and a top portion which is formed by a splitter 35 into an output ring 37. Interaction chamber 33 is circular in cross section.

Control passageways 39–44 are formed in plate 25 and extend toward each other and terminate in control nozzles such as nozzles 45, 47 which open into interaction chamber 33 and direct control streams into chamber 33 to impinge upon and control the direction of flow of the power stream entering interaction chamber 33 from power nozzle 31.

Splitter plate 27 includes the splitter 35 which is cone-shaped and extends into interaction chamber 33 of control passageway plate 25 to form output ring 37 with the cone-shaped walls of chamber 33. Plate 27 also includes output passageways 48–53 which register with ring 37.

It is to be noted that a number of the passageways in fluidic element 21 extend in the direction which is perpendicular to the plane of the plate elements 23, 25, and 27. In other words fluid input chamber 29, power nozzle 31, interaction chamber 33, output ring 37, and passageways 48–53, extend in a direction which is perpendicular to the parallel planes of plates 23, 25, and 27.

Figure 5:
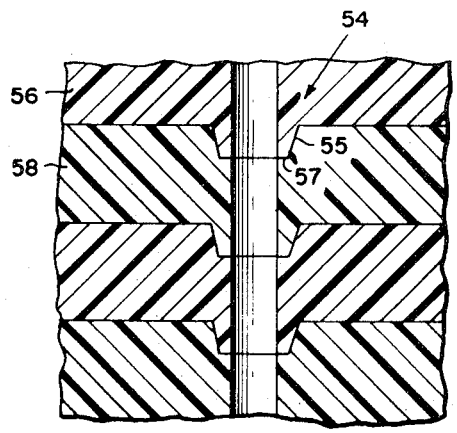
FIG. 5 is an enlarged fragmentary view in section of a sealing connection between fluidic plates.

Means are provided for connecting adjacent plates together and forming a tight seal between the plates. Such means may be a male and female deforming tapered socket 54, such as is shown in FIG. 5. Socket 54 includes a male element 55 that extends downwardly from plate 56 and fits into a female element 57 in plate 58. Elements 55 and 57 are tapered so that there is a wedging action between the elements which causes a tight seal.

Figure 6:
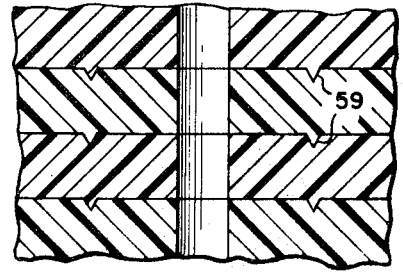
FIG. 6 is an enlarged fragmentary view in section of another sealing connection between fluidic plates.

Another type of sealing means is shown in FIG. 6, and comprises deforming ledges 59 that are formed in one plate and bite into the abutting plate, thereby locally deforming the other plate. Ledges 59 do not deform the entire abutting plate, but just deform it locally.

In operation of fluidic amplifier 21, fluid is conducted to fluid input chamber 29 in power nozzle plate 23 and is directed from power nozzle 31 into interaction chamber 33 in the form of a fluidic stream. This power stream is impinged upon in chamber 33 by a control stream from one or more of the control nozzles such as 45 and 47 which action of the control streams on the power stream causes the power stream to be directed toward a section of output ring 37, and the power stream locks on to the sidewall of interaction chamber 33. If no control streams acts upon the power stream, the power stream is split ino many streams by splitter 35 which directs a portion of the power stream uniformly around ring 37.

Output passageways 48-53 conduct the output stream to other passageways or other fluidic elements.

Figure 7:
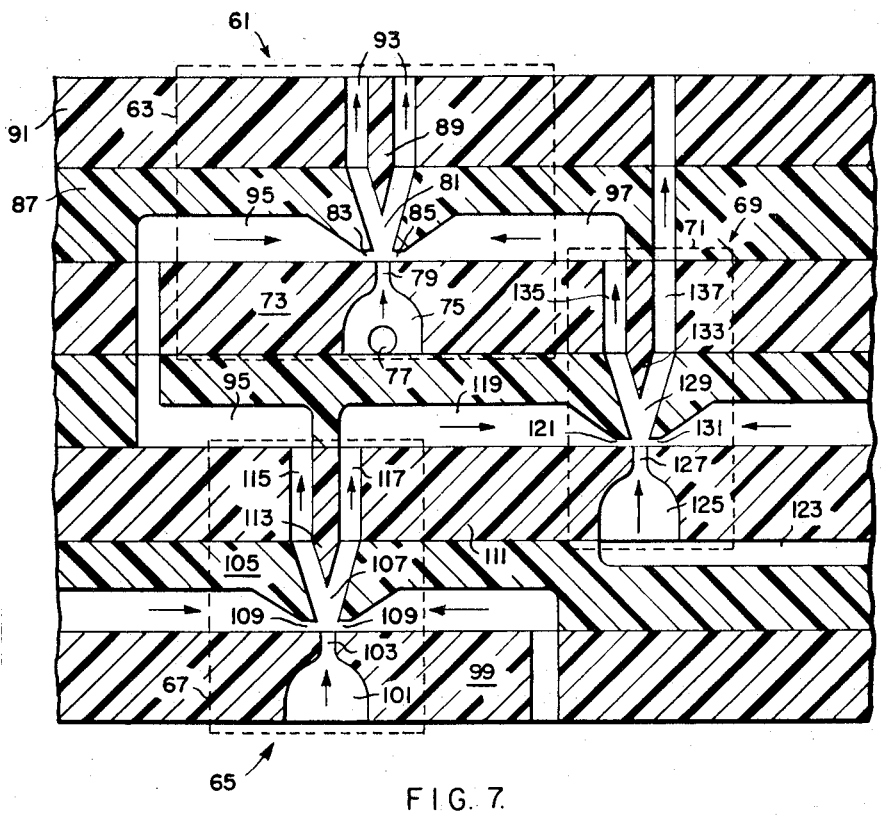
FIG. 7 is a fragmentary view in section of a fluidic system showing several fluidic elements.
Figure 8:
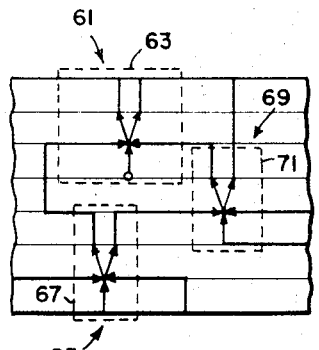
FIG. 8 is a schematic view of FIG. 7.

Turning now to FIGS. 7 and 8, there is shown a fluidic system including several fluidic elements that are interconnected.

An amplifier 61 is contained within dotted lines 63, an amplifier 65 is contained within dotted lines 67, and an amplifier 69 is contained within dotted lines 71.

Amplifier 61 includes a power nozzle plate 73 having a fluid input chamber 75 that is fed by a power input passageway 77 which extends parallel to the planes of the flat surfaces of plate 73.

From fluid chamber 75, the power stream passes through power nozzle 79 into interaction chamber 81 where it is impinged upon by the control streams emanating from control nozzles 83 and 85 which are formed in control-passageway plate 87.

A splitter 89 extends from splitter plate 91 into interaction chamber 81, and output passageways 93 carry off the output from amplifier 61.

Control nozzle 83 is fed by a control passageway 95 which connects to the output of amplifier 65, and control nozzle 85 is fed by control passageway 97 which is fed by the output from amplifier 69.

Amplifier 65 includes power nozzle plate 99 with fluid input chamber 101 and power nozzle 103, control passageway plate 105 with interaction chamber 107 and control nozzles 109, and splitter plate 11 with splitter 113 and output passageways 115 and 117. Output passageway 115 connects with passageway 95 which feeds control nozzle 83 of amplifier 61. Output passageway 117 connects to passageway 119 which feeds control nozzle 121 in amplifier 69.

Amplifier 69 includes power input passageway 123, fluid input chamber 125, power nozzle 127, interaction chamber 129, control nozzles 121 and 131, splitter 133, and output passageways 135 and 137. Output passageways 135 feeds control passageways 97 of amplifier 61.

Examination of FIG. 7 discloses that each fluidic plate is a portion of a strip of plates, with each plate adapted to contain various components of a fluidic element. For example, plate 73 contains fluid input chamber 75 and power nozzle 79 which are components of fluidic amplifier or element 61, and the adjacent plate of the strip contains output passageways 135 and 137 of fluidic amplifier or element 69.

Figure 9:
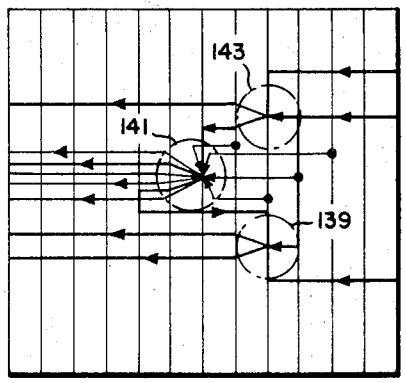
FIG. 9 is a schematic view of another fluidic system.

FIG. 9 is a schematic view of another fluidic system which includes fluidic amplifiers 139, 141, and 143. An output passageway from amplifier 141 feeds one of the control nozzles of amplifier 139. Amplifier 143 is provided with but one control nozzle, while amplifier 141 has four control nozzles and six output passageways. One of the control nozzles of amplifier 141 is fed by one of the output passageways from amplifier 143.

FIGS. 10 through 13 illustrate the apparatus for forming the fluidic element components, such as power nozzle plates and control plates. Standard mold units are provided which may be combined in various ways to form plate strips. The use of standard mold units for the components provides flexibility to the designer of the fluidic system.

Figure 10:
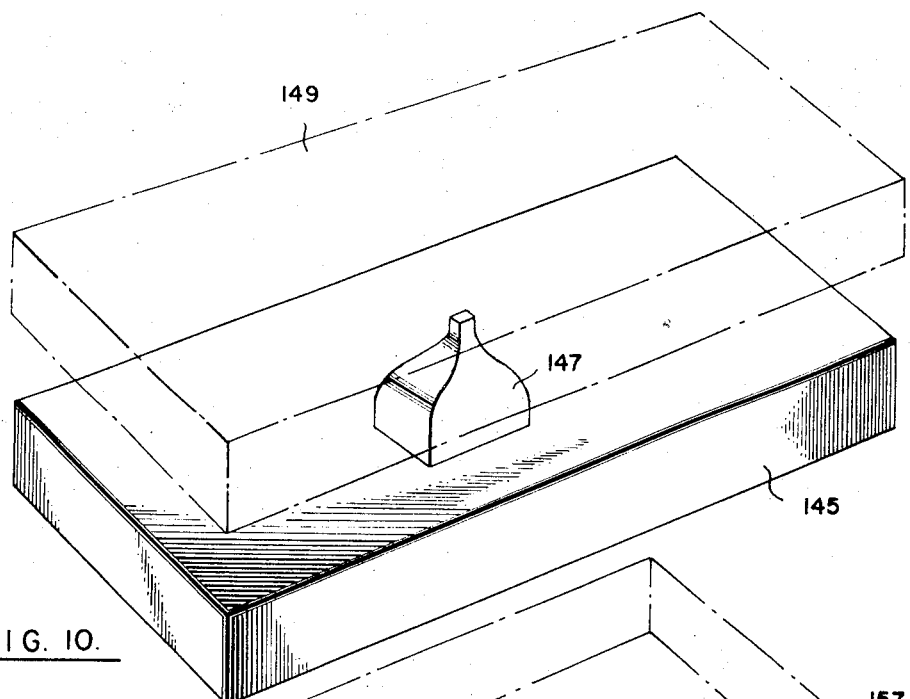
FIG. 10 is a perspective view of a mold unit adapted to form a power nozzle plate.

FIG. 10 is a view in perspective of mold unit adapted to form a power nozzle plate and includes mold base 145 with its power nozzle-input chamber boss 147, and a cover member 149. Boss 147 is shown as being four-sided in horizontal section, but it may be circular in horizontal section, if desired.

Figure 11:
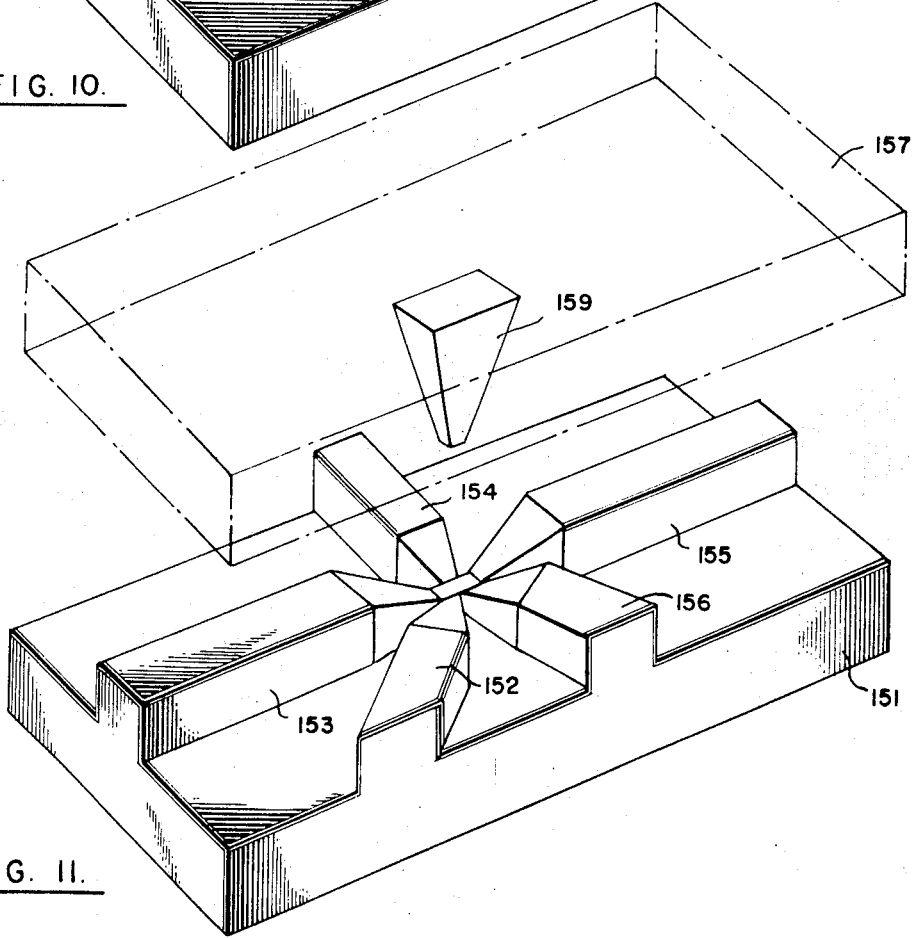
FIG. 11 is a perspective view of a mold unit adapted to form a control passageway plate.

FIG. 11 is a view in perspective of a mold unit adapted to form a control passageway plate and includes mold base 151 having bosses 152-156 for forming five control passageways and nozzles. A cover member 157 has a depending boss 159 which forms the interaction chamber in the control passageway plate. Boss 159 is shown as being four-sided in horizontal section, but it may be many-sided or circular.

To form the power nozzle plate liquid plastic or the like is poured between mold base 145 of FIG. 10 and cover member 149 and is allowed to set. Then cover member 149 is removed and the formed power nozzle plate is removed from base 145.

Similarly, in FIG. 11, to form a control passageway plate, liquid plastic or the like is poured onto the mold base 151. Cover member 157 is then placed on top of the plastic with boss 159 projecting therein. After the plastic has hardened, base 151 and cover member 157 are removed.

Figure 12:
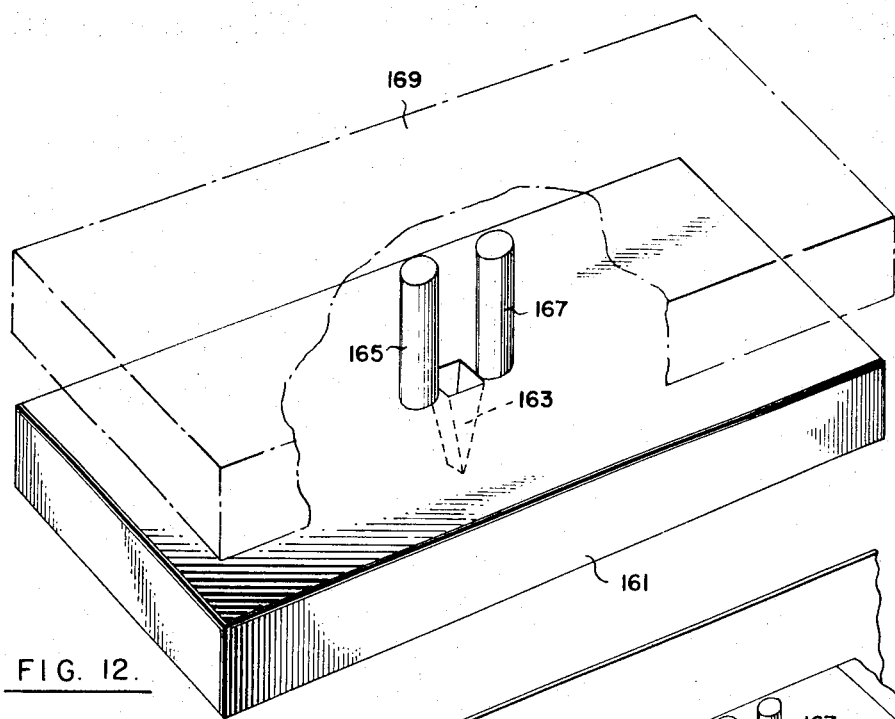
FIG. 12 is a perspective view of a mold unit adapted to form a splitter plate.

FIG. 12 is a view in perspective of a mold unit adapted to form a splitter plate, and includes mold base 161 having a splitter cavity 163 formed therein and pins 165, 167 extending upwardly therefrom. Splitter cavity 163 may be cone-shaped and a greater number of pins may be used, depending on the number of output passageways desired. Splitter cavity 163 forms the splitter of the splitter plate, and pins 165 and 167 form the output passageways. A cover member 169 is provided, and the splitter plate is formed by pouring liquid plastic or the like onto base 161 and covering the liquid plastic with cover member 169 until the plastic has set. Then base 161 and cover member 167 are removed. If desired, pins 165 and 167 may depend from cover member 169 instead of extending upwardly from base 161.

Figure 13:
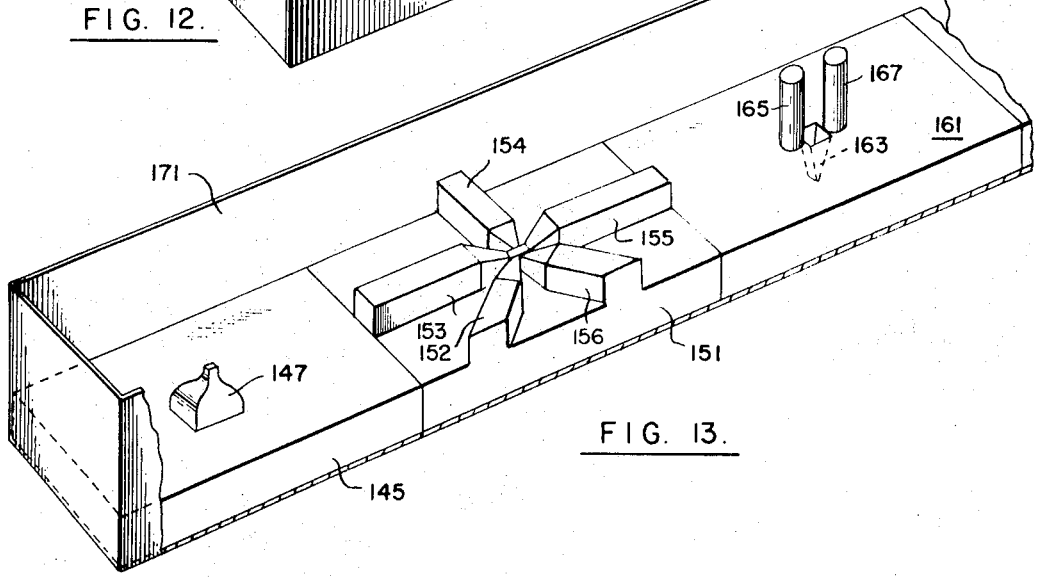
FIG. 13 is a perspective view of various mold units placed in a mold tray and adapted to form a strip of various plates.

FIG. 13 is a view in perspective of various mold units placed in a mold tray 171, and illustrates how the mold units may be used to form a strip of fluidic plates containing various components of fluidic elements.

The method of making a strip of fluidic plates comprises the steps of placing in the tray 171 in a desired configuration a number of standard mold units adapted to form the components of fluidic elements, covering the mold units with a molten or a liquid plastic or the like, allowing the plastic to harden to form a strip of fluidic plates, and removing the strip from the tray.

In making the fluidic plate strips, they may be made of plastic by an injection molding process, or the plastic may be poured into the tray, or it may be extruded therein. Of course, molten metal may be used if desired, as may other materials.

The provision of standard mold units of components of fluidic elements allows the fluidic system designer considerable flexibility in construction of his system.

I claim:

1. A method of making fluidic elements having interchangeable components comprising the steps of making a plurality of plates, forming a fluidic element component in each plate with said component extending in a plane perpendicular to the plane of its plate, placing the plurality of plates together in abutting relationship so that said components form a fluidic element which extends in a plane perpendicular to the planes of the plates, connecting the plates together, and forming a tight seal between the plates.

2. The method of claim 1, wherein said step of making a plurality of plates comprises forming a power nozzle plate with a fluid chamber and power nozzle therein, forming a control passageway plate with an interaction chamber having a bottom opening adapted to register with said power nozzle an with a control passageway terminating in a control nozzle which opens into the interaction chamber, and forming a splitter plate with a splitter which is adapted to extend into said interaction chamber to form an output ring therein and including an output passageway, and said step of placing the plates together comprises placing them together so that they form a fluidic amplifier which extends in a plane perpendicular to the planes of the plates with the interaction chamber bottom opening registering with said power nozzle and said splitter extending into said interaction chamber to form an output ring therein.

3. The method of claim 1 including changing the characteristics of said fluidic amplifier by substituting a different component plate for one of the component plates.

4. The method of claim 1 wherein said step of making a plurality of plates includes forming a series of fluidic element components in a strip of plates, and said step of placing the plates together comprises placing a number of said strips together to form a fluidic system having a number of fluidic elements that are interconnected.

5. The method of claim 2 including further changing the characteristics of said fluidic system by substituting a second different component strip for another of the component strips.

6. The method of claim 1 wherein said step of making a plurality of plates includes placing in a tray a standard mold unit adapted to form a component of a fluidic element, covering the mold unit with a liquid plastic, allowing the plastic to harden forming a fluidic plate having a component extending perpendicularly to the plane of the plate, and removing the plate from the tray.

7. The method of claim 1 wherein said step of making a number of plates includes placing in a tray in a desired configuration a plurality of standard mold units adapted to form components of fluidic elements, covering the mold units with a liquid plastic, allowing the plastic to harden forming a strip of fluidic plates having components extending perpendicularly to the plane of the plates, and removing the strip from the tray, and said step of placing the plates together comprises placing a plurality of said strips together to form a fluidic system having a plurality of fluidic elements that are interconnected.

8. A method of making fluidic elements having interchangeable components comprising the steps of placing in a tray in a desired configuration a number of standard mold units adapted to form components of fluidic elements, covering the mold units with a plastic, allowing the plastic to harden to form a strip of fluidic plates, removing the strip from the tray, repeating the forementioned steps to produce the desired number of strips, assembling together a plurality of the strips to form fluidic elements in such manner that the components of each fluidic elements are in adjacent strips so that the fluidic elements extend in a plane perpendicular to the plane of the strips, connecting the strips together, and forming a tight seal between the strips.

9. The method of claim 8, including changing the characteristics of a fluidic element by substituting a different component strip for one of its component strips.

* * * * *